US008588694B2

United States Patent
Goransson et al.

(10) Patent No.: US 8,588,694 B2
(45) Date of Patent: Nov. 19, 2013

(54) ANTENNA WEIGHTS CALCULATION BASED ON USERS' INTERFERENCE REJECTION CAPABILITIES

(75) Inventors: Bo Goransson, Sollentuna (SE); Sven Petersson, Savedalen (SE); Stefan Felter, Bromma (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 869 days.

(21) Appl. No.: 12/669,548

(22) PCT Filed: Jul. 19, 2007

(86) PCT No.: PCT/SE2007/050530
§ 371 (c)(1),
(2), (4) Date: Jan. 18, 2010

(87) PCT Pub. No.: WO2009/011626
PCT Pub. Date: Jan. 22, 2009

(65) Prior Publication Data
US 2010/0194650 A1    Aug. 5, 2010

(51) Int. Cl.
*H04B 1/00*    (2006.01)
*H04B 17/00*    (2006.01)

(52) U.S. Cl.
USPC ............ 455/60; 455/63.1; 455/63.4; 455/65; 455/67.14; 455/67.15; 455/67.16

(58) Field of Classification Search
USPC ............ 455/60, 63.1, 63.4, 65, 67.14, 67.15, 455/67.16
See application file for complete search history.

(56) References Cited

U.S. PATENT DOCUMENTS

| 7,634,235 B2 * | 12/2009 | Catreux-Erceg et al. .. 455/67.11 |
| 8,098,616 B2 | 1/2012 | Kishigami et al. |
| 2004/0018818 A1 | 1/2004 | Hottinen et al. |
| 2004/0203456 A1 * | 10/2004 | Onggosanusi et al. .... 455/67.13 |

(Continued)

FOREIGN PATENT DOCUMENTS

| JP | 2004201296 A | 7/2004 |
| JP | 2006238423 A | 9/2006 |

(Continued)

OTHER PUBLICATIONS

Schubert, M. et al. "Solution of the Multiuser Downlink Beamforming Problem With Individual SINR Constraints." IEEE Transactions on Vehicular Technology, vol. 53, No. 1, Jan. 2004. pp. 18-28.

(Continued)

*Primary Examiner* — Wen Huang
(74) *Attorney, Agent, or Firm* — Coats and Bennett, P.L.L.C.

(57) ABSTRACT

The present invention relates to a method and arrangement in a transmitter unit of a multi-antenna system for an improved calculating of the antenna weights for a beamforming transmission of data from a transmitter unit to a target receiver unit, whereby interfering signal components for receiving units other than the target receiving unit and the desired communication signal at a target receiving unit are weighted by receiver-specific parameters describing the receiver capabilities of said units in terms of their capability for interference suppression and/or signal enhancement. The invention also relates to a method and arrangement for scheduling of user equipments by using said information on the signal processing capabilities for received signals of each receiving unit.

10 Claims, 6 Drawing Sheets

(56) References Cited

U.S. PATENT DOCUMENTS

| | | | |
|---|---|---|---|
| 2006/0270360 A1* | 11/2006 | Han et al. | 455/69 |
| 2007/0015545 A1* | 1/2007 | Leifer et al. | 455/562.1 |
| 2007/0105559 A1* | 5/2007 | Dillon et al. | 455/443 |
| 2007/0174038 A1 | 7/2007 | Wang et al. | |
| 2009/0016263 A1 | 1/2009 | Kishigami et al. | |

FOREIGN PATENT DOCUMENTS

| | | |
|---|---|---|
| JP | 2008511219 A | 4/2008 |
| JP | 2009514383 A | 4/2009 |
| RU | 2285339 C2 | 10/2006 |
| RU | 2302697 C2 | 7/2007 |
| WO | 2005011146 A1 | 2/2005 |
| WO | 2005020467 A1 | 3/2005 |
| WO | 2006021224 A1 | 3/2006 |

OTHER PUBLICATIONS

Hwang, S.-S. et al. "Multi-beam Multiplexing using Multiuser Diversity and Random Beams in Wireless Systems." IEEE International Conference on Communications, 2005 (ICC 2005), vol. 4, May 16-20, 2005, pp. 2717-2721.

* cited by examiner

ANTENNA WEIGHTS CALCULATION BASED ON USERS' INTERFERENCE REJECTION CAPABILITIES

TECHNICAL FIELD

The present invention relates to methods and arrangements in a telecommunication system, in particular to methods and arrangements for improved beamforming transmission in a radio communication network.

BACKGROUND

In beamforming data transmission from a transmitter unit to a receiver unit it is necessary to calculate the beams to the various scheduled receiver units in such a way that the reception of desired signals can be enhanced while simultaneously suppressing interfering signals. When applying a minimum means square error as the optimization criterion, the optimized antenna weights can be determined from the Wiener-Hopf solution as described in the algorithm below.

The system model for a base station 11 as depicted in FIG. 1 refers to a multi-antenna base station comprising antennas 13 $A_0 \ldots A_{K-1}$ that are here, arranged as a uniformly spaced linear array (ULA). This, however, should only be understood as a non-limiting example that does not exclude other arrangements, e.g. circular arrangements, when adapting the formulas below.

The signal at the antenna array of the transmitter unit 111 of the base station 11 can be expressed as $$x(t) = s(t) \cdot v + \sum_{i=1}^{N} u_i(t) \cdot \eta_i + e.$$

Hereby, s(t) denotes the data signal to be transmitted to the user $UE_0$ of interest while $u_i(t)$ represents the contribution of the interfering signal vectors from other equipments, i.e. $UE_1, \ldots, UE_N$. v is the array propagation vector for the desired signal s(t) and $\eta_i$ the array propagation vector for the interfering signal $u_i(t)$ from user equipment $UE_i$. The array propagation can also be denoted the spatial signature of a signal represented by the relative phases at which the signal is received by the antennas of a receiver unit. e is a white noise component including, inter alia, thermal noise and outercell interference contributions.

For a base station comprising a uniformly spaced antenna array as described above, the array propagation vectors can be expressed as $$v^T = \left[1, e^{j\frac{2\pi}{\lambda}d\cdot\sin\theta_0}, \ldots, e^{j\frac{2\pi}{\lambda}(K-1)d\cdot\sin\theta_0}\right]$$

and $$\eta_i^T = \left[1, e^{j\frac{2\pi}{\lambda}d\cdot\sin\theta_i}, \ldots, e^{j\frac{2\pi}{\lambda}(K-1)d\cdot\sin\theta_i}\right].$$

$v^T$ denotes the vector of phase relations at the K antennas $A_0 \ldots A_{K-1}$ of a uniformly spaced antenna array with distance d between the antenna elements, said relations relative to a reference antenna with normalized signature 1 when receiving the signal s(t) with wavelength $\lambda$ and under an angle $\theta$ to the antenna plane. $\eta_i^T$ describes the corresponding vector for a signal $u_i(t)$.

When defining a vector $w=[w_0, w_1, \ldots, w_{K-1}]$ of antenna weights, one conceivable criterion to achieve an optimization of the beamformer output signal $w^H \cdot x(t)$ is to minimize the error $\epsilon(t)$ between said beamformer output signal and the desired signal s(t) (or a signal d*(t) that sufficiently close represents s(t) or at least correlates to a certain extent to the characteristics of s(t)). A minimization of $\epsilon^2(t)=(d^*(t)-w^H \cdot x(t))$ can likewise be expressed by the equation $\nabla w(E\{\epsilon^2(t)\})=0$.

When defining $r=E\{d^*(t)\cdot x(t)\}$ and $R=E\{x(t)\cdot x^H(t)\}$, the solution of the equation above is $w_{opt}=R^{-1}\cdot r$. Each of the K complex elements of the vector $w_{opt}$ describes amplitude and phase requirements for weighting the corresponding antenna element to form an optimized beam for transmission of the desired signal s(t) to the user equipment $UE_0$.

The document WO 2005/060123 discloses an optimization for a MIMO network by selecting first and second sets of users, the second set not comprised in the first set, and adapting communication parameters for transmissions to said first and second set according to said parameters. In this way, communication with one or a few users can be optimized while network resources can be used in an efficient way also for other users.

The document US 2002/0094843 discloses a (sector) antenna beam-stearing using feedback from mobile stations for enhancing antenna beam steering effectiveness and efficiency.

SUMMARY

For beamforming transmissions in a multi-antenna transmission system the vector $w_{opt}$ of optimum antenna weights for receiver units to be scheduled can be determined, e.g., from the Wiener-Hopf solution demonstrated above. However, as such solutions implicitly include the restricting assumption that the receiver units have the same capabilities in terms of processing the received signals, it has been observed to be a problem that the optimization algorithm according to the state of the art nevertheless does not lead to an optimized weighting of the antenna beams to scheduled receiver units.

It is thus an object of the present invention to achieve a generalized method and arrangement for providing an optimization of antenna weights for beamforming transmission that can take into account the various capabilities of receiver units.

Briefly, the present invention applies a method performed in a transmitter unit of a multi-antenna system for an improved calculating of the antenna weights for a beamforming transmission of data from a transmitter unit to a target receiver unit, whereby interfering signal components for receiving units other than the target receiving unit and the desired communication signal at a target receiving unit are weighted by receiver-specific parameters describing the receiver capabilities of said units in terms of their capability for interference suppression and/or signal enhancement. These parameters are then used to determine the antenna weights for the beamforming transmission.

The present invention also relates to a method for scheduling of user equipments by using said information on the signal processing capabilities for received signals of each receiving unit. The scheduling for one or more user equipments for data transmission can be based at least on said information on the signal processing capabilities of their respective receiving unit.

The present invention implies the advantage to increase the knowledge of a scheduler for beamforming transmission about the scheduled units. By using a-priori information of the receiver capabilities of the scheduled units it is therefore possible to make better scheduling decisions.

It is thus an advantage of the present invention to achieve an improved scheduling of user equipments for beamformed transmission and, thus, an improved system throughput.

BRIEF DESCRIPTION OF THE DRAWINGS

FIG. 4a illustrates transmission beams as applied in the state of the art while

DETAILED DESCRIPTION

The present invention refers to an optimization problem with respect to the weighting of the various antennas in a multi-antenna base station system. Optimizations can be performed either by optimizing one property, e.g. the antenna weights, at a time or by means of a joined optimization.

The antenna arrangements of the multi-antenna base station 11 have been described by means of a uniformly spaced linear array (ULA). This, however, should only be understood as a non-limiting example that does not exclude other antenna arrangements, e.g. circular arrangements.

Figure 1:
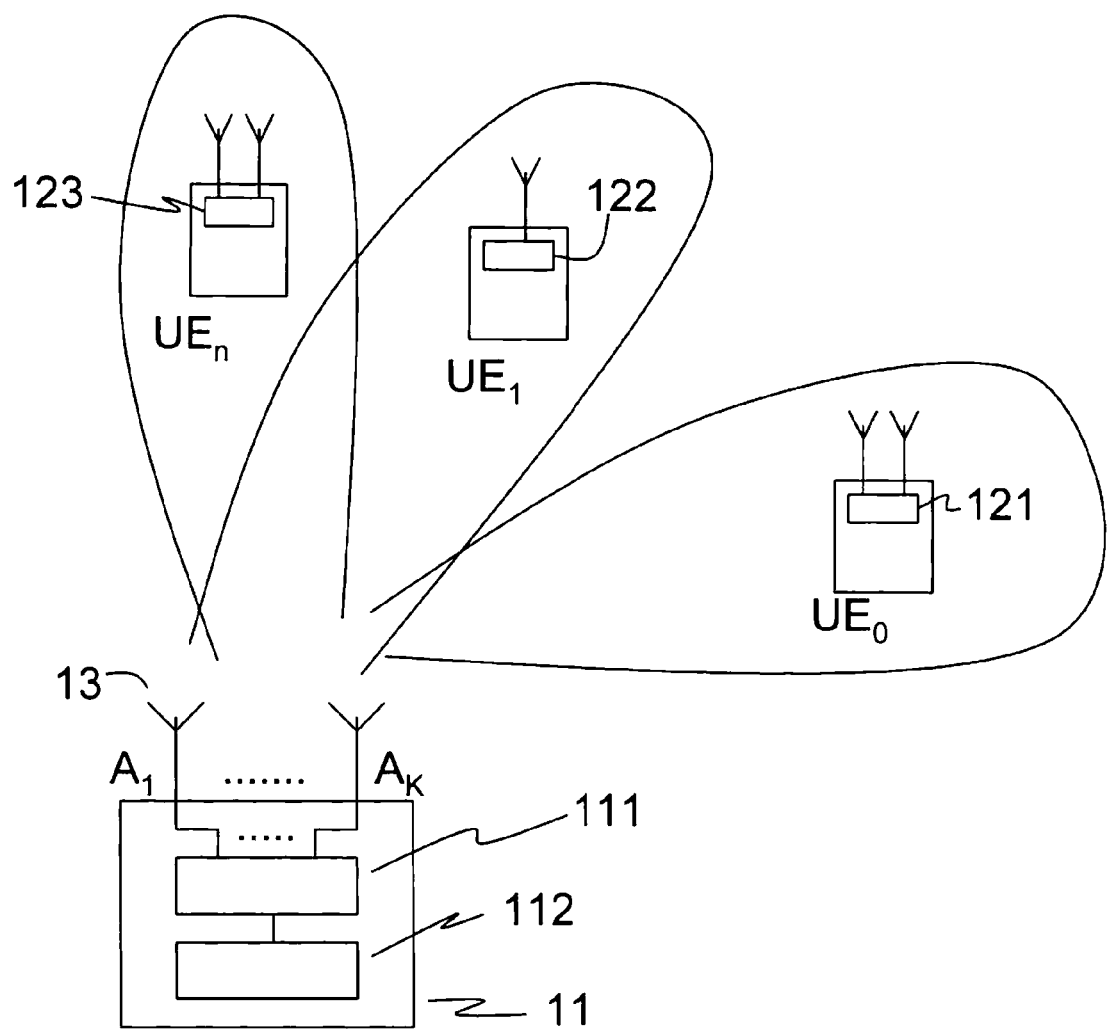
FIG. 1 illustrates a part of a multi-antenna radio communication system within which the present invention can be applied.

The vector $w_{opt}$ of optimized antenna weights according to the state of the art algorithm describes the requirements on the antenna elements for achieving optimized beams only for the implicit assumption that each of the receiver units has similar capabilities with regard to the processing of received signals. Such capability characteristics include, for instance, various signal enhancements or applied means for interference suppression. For instance, in a scenario as depicted in FIG. 1, it is conceivable that a base station serves terminals including receiver units with a wide range of signal receiving capabilities spanning from, e.g., low-end terminals with simple RAKE-receivers to high-end terminals possibly equipped with 2 RX-antennas and interference suppression capabilities. Consequently, due to the differences in the receiver capabilities the optimization algorithm described above would not lead to an optimized antenna beam.

It has therefore been the basic idea of the present invention to introduce additional information with regard to the receiver capabilities and thus create an amended system model to achieve an improved calculation of antenna weights when using said optimization algorithm.

It is a first aspect of the present invention how to retrieve such additional information from appropriate system parameters and a second aspect how to use this additional information.

According to one embodiment of the present invention, the additional information regarding the receiver capabilities are determined by an estimation process. According to a second embodiment of the present invention, said receiver capabilities are retrieved from information that is already transmitted from the user equipments to the base station. For instance, it would be possible to retrieve this information from the UE category information as described in the document 3GPP TS 25.101, "User Equipment (UE) radio transmission and reception (FDD)" issued by the 3rd Generation Partnership Project (3GPP). In said document, table 9.1 determines the minimum performance requirements for a particular UE belonging to certain HS-DSCH category. Another possibility would be the document TS 25.433, "UTRAN Iub interface Node B application part (NBAP) signalling" also issued by the 3rd Generation Partnership Project (3GPP).

For either of these embodiments the method according to the present invention then derives additional performance parameters to describe the receiver capability behaviour in a formalised way:

A first parameter $\mu$ relates to the signal enhancement performance at the receiver, which parameter provides a measure for the capability of the receiver to extract the desired signal s(t), i.e. the signal that is intended to be received by this receiver, out of the received signal. In an example embodiment of the present invention, $\mu$ could take the value $\mu=1$ for an ideal receiver while real receiver systems achieve a value $0<\mu<1$.

A second parameter $\delta$ relates to the capability of the receiver to suppress interference resulting from received signals other than the desired signal, i.e. a measure of the interference that the receiver cannot suppress signals. In an example embodiment of the present invention, $\delta$ could take the value $\delta=0$ for an ideal receiver that can suppress all interference while real receiver systems achieve values $0<\delta<1$.

The impact of the receiver capability as expressed by the performance parameters above on the signal at the antenna array of the transmitter unit can thus be expressed as $$x_m(t) = \mu \cdot s(t) \cdot v + \sum_{i=1}^{N} \delta_i u_i(t) \cdot \eta_i + e.$$

An example embodiment which is implemented in a unit of a base station derives an optimized beamforming shape by calculating an optimised set of antenna weights for data transmission to a scheduled receiver unit. It is assumed that there are a number N of receiver units to be scheduled, whereby the receiver units are represented by an index n. For the sake of simplicity but not as a restriction, it is also assumed that there is an equal path gain and required signal-to interference and noise ratio (SINR) for the transmission paths between transmitter unit and the receiver units.

In a first step, the scheduler retrieves the array propagation vector $v^T(n)$ and the interference suppression parameter $\delta_i(n)$ for each of the receiver units to be scheduled. Then, in a next step for each user n the intracell interference $$u(n) = \sum_{i=1, i \neq n}^{N} \delta_i(n) \cdot v(i)$$

and the white noise contribution (i.e. thermal noise and outercell interference) $\sigma^2 \cdot I$ is calculated. The factor $\delta_i(n)$ thus represents the impact of the receiver capability of the various receiver units to be scheduled.

Thus, the improved vector $w_{opt,m}$ of antenna weights can now be calculated by applying the modified signal $x_m(t)$ at the antenna array of the transmitter unit as $$w_{opt,m} = R^{-1} \cdot r = E\{x_m(t) \cdot x_m^H(t)\}^{-1} \cdot E\{d^*(t) \cdot x_m(t)\}.$$

The correlation between the user signals, also denoted the orthogonality factor, needs to be estimated. For instance, in a WCDMA-based radio network, this correlation is a code and channel dependent quantity and the orthogonality factor can, without any loss of generalisation, be set to 1.

Figure 2:
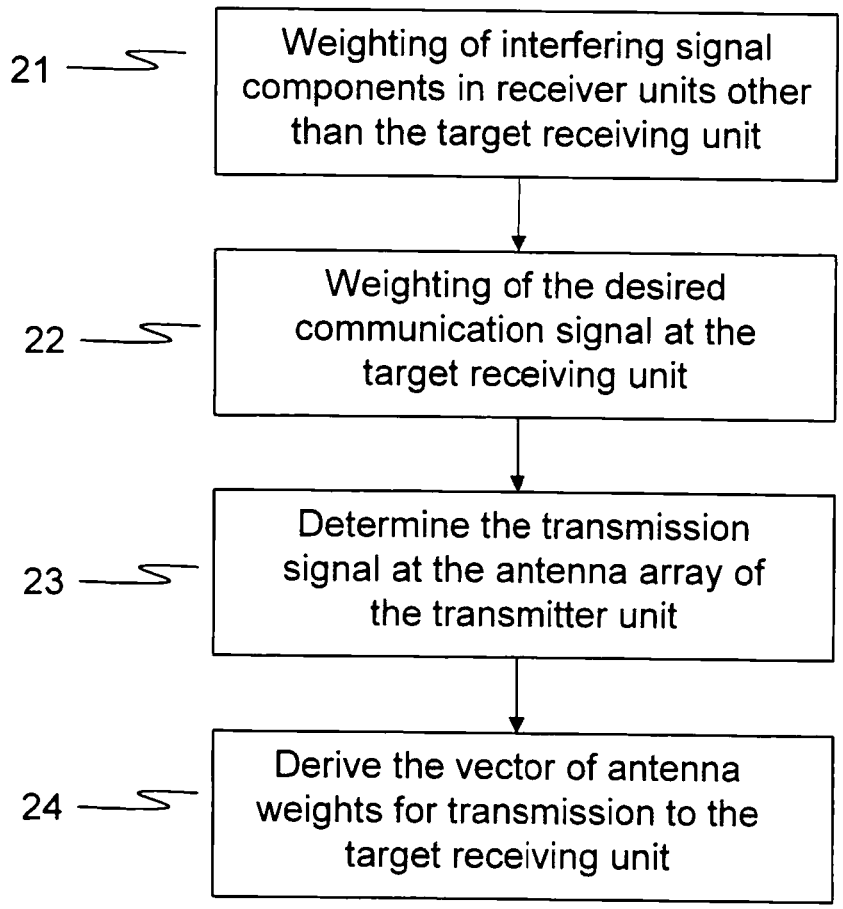
FIG. 2 illustrates a flowchart for determining antenna weights for a beamforming transmission in a multi-antenna system according to the present invention.

FIG. 2 illustrates a flowchart for antenna weight calculation that is performed in the transmitter unit of a multi-antenna base station system. As derived above, the present invention aims to provide additional information regarding the receiving unit capabilities for determining the beams for data transmission to said receiving units. This additional information is included by a weighting of the signal components at a target receiving unit and other receiving units. The interfering signal components for receiving units other than the target receiving unit are weighted 21 with a receiver-specific interference suppression parameter δ as defined above. The desired communication signal at the target receiving unit can be weighted 22 with a signal enhancement parameter μ, also as defined above. It is then possible to determine 23 the amended transmission signal $x_m(t)$ at the antenna array of the transmitter unit from the weighted signal components and the corresponding antenna propagation vector for each receiving unit. The antenna weights for the transmission beam are then derived 24 from the covariance matrix for the transmission signal and the covariances between said transmission signal and an at least sufficient approximation of the desired communication signal.

Figure 4A:
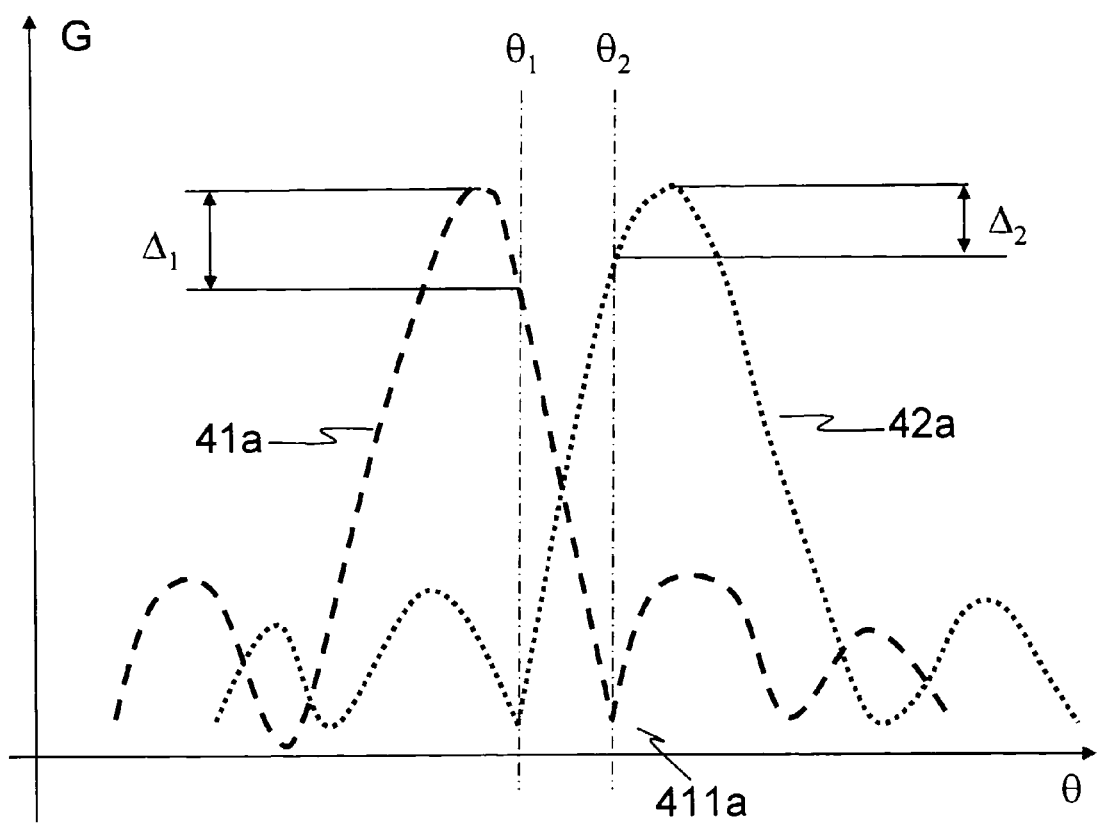
Figure 4B:
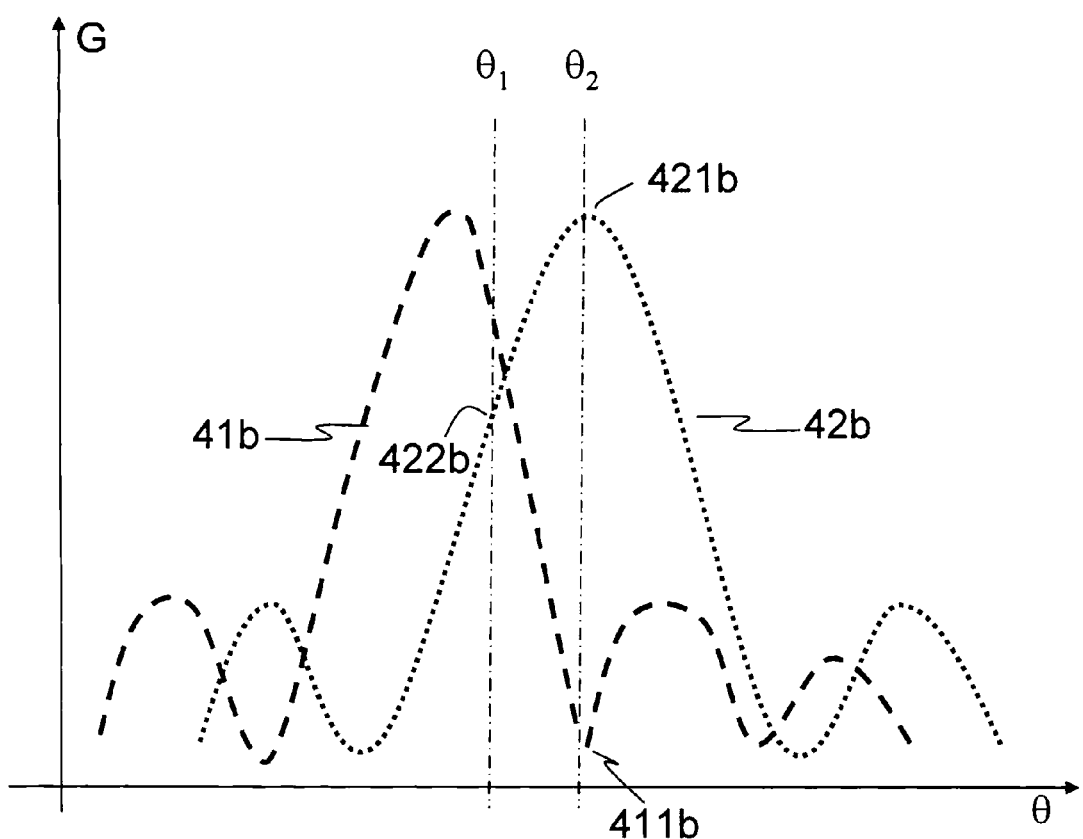
FIG. 4b illustrates the transmission beams as applied when using the present invention.

In order to illustrate the benefits of the present invention, FIG. 4a shows the downlink beamforming patterns 41a,42a for two simultaneously scheduled receiver units in an interference-limited scenario according to the state of the art while FIG. 4b shows said downlink beamforming patterns 41b,42b when applying the present invention. The figures represent said patterns in a diagram of the antenna gain G expressed in dB versus the direction of arrival angle Θ, whereby $Θ_1$ denotes the direction angle for the first receiver unit and, correspondingly, $Θ_2$ the direction angle for the second receiver unit. The scheduler is forced to balance between the requirements of maximised beam powers in the direction of the respective receiver units on the one hand and minimised influence from interfering beams on the other hand. In FIG. 4a the beam pattern 41a is directed to the first receiver unit in such a way that its contribution 411a in direction to other units (here denoted by the direction angle $Θ_2$) is at a minimum rather than directing the beam peak in the direction $Θ_1$ of the intended receiver unit. A corresponding observation can be made for the beam pattern 42a to the second receiver unit. This is the consequence of the fact that the scheduler considers the negative impact of interfering beams higher than the possible gains that could be achieved due to an optimised directing of the beam peak. However, this deviation of the beam peaks leads to a gain loss, or a loss of beam focus, $Δ_1$ and $Δ_2$, in direction of the receiver unit.

The present invention allows an optimisation of the scheduling as will be explained by help of FIG. 4b. As in FIG. 4a the beam patterns 41b,42b are represented in a diagram of the antenna gain G expressed in dB versus the direction of arrival angle Θ, whereby $Θ_1$ and $Θ_2$ denote the direction angles to the first and second receiver unit, respectively. The present invention can, compared to prior-art solutions, use more information for the scheduling decisions by introducing the interference suppression capabilities of the receiver units and implies therefore fewer restrictions in the directing of the beams to the various receiver units as apparent from FIG. 4b. In FIG. 4b it is assumed that the receiver units corresponding to the two beam patterns 41b,42b have different receiver capabilities, e.g. indicated by different values for their respective interference suppression parameters $δ_1$ and $δ_2$. Assuming, for instance, that the first receiver unit in a direction $Θ_1$ has a higher capability to suppress interference than the receiver unit in direction $Θ_2$, i.e. $δ_1<δ_2$. Then, the present invention allows it to direct the beam peak 421b towards the second receiver unit without taking into account the interference impact 422b on the first receiver unit. Thus, the beam pattern 41b to the first receiver unit is still placed as to minimise the interference impact 411b on the second receiver unit due to the (known) worse interference suppression capabilities of the second receiver unit. However, the beam 42b towards the second receiver unit can be placed such that this unit can benefit from the maximum beam power 421b although this beam directing leads to an increased interference 422b at the first receiver unit, which however, has the (known) better capability to suppress this additional interference.

Summarized, it is a basic part of the solution according to the present invention to provide a scheduling where the beams towards receiver units with good interference suppression capabilities are directed such as to minimise their impact on other receiver units while allowing that beams towards receiver units with worse interference suppression capabilities can be directed such as to maximise their beam peaks in the direction to the receiver unit. Preferably, the minimisation of the interference is performed at least with regard to those receiver units having worse suppression capabilities. This is achieved by providing knowledge to the transmitter unit of the interference suppression capabilities of the various receiver units.

The present invention contributes to an improved system performance in terms of data throughput from the transmitter unit to the receiver units. The scheduler can thus optimise its usage of transmission resources, e.g. power, time, frequency, etc., such as to achieve a higher system gain.

Figure 3:
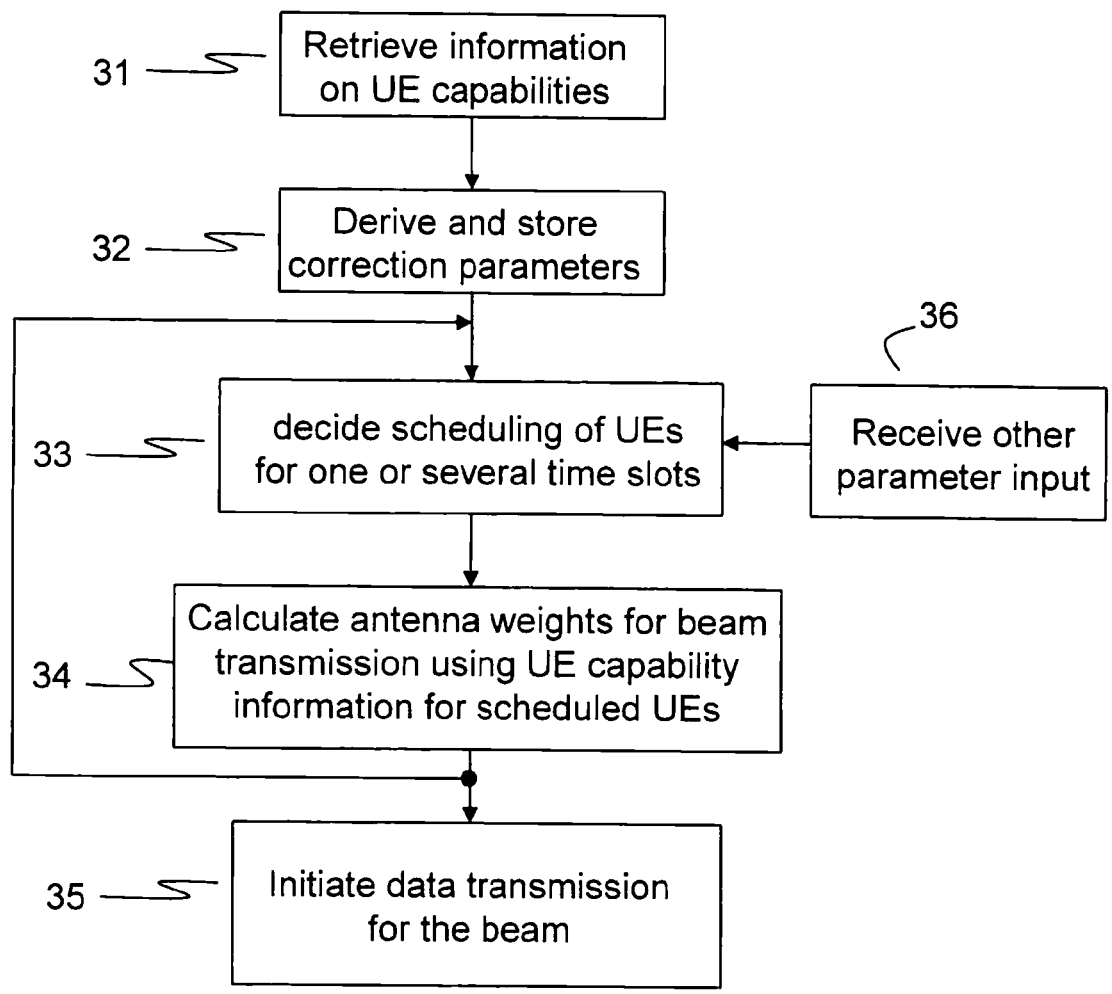
FIG. 3 illustrate a flowchart in a base station of a multi-antenna system applying the present invention.

The scheduler can benefit from the performance parameters, i.e. the correcting parameters δ and/or μ of the MMSE-algorithm described above. FIG. 3 illustrates a corresponding flowchart for scheduling of one or more user equipments in a base station of a multi-antenna system: Information about the capability classes of the receiver units can be retrieved 31 from signalled information from the receiver units or, possibly, estimated by the base station itself. From this information the base station can derive 32 the correcting parameters, e.g. δ and/or μ, for use in the improved calculation of the antenna weights and store these parameters accordingly. From this information and, optionally, other relevant information 36 the scheduler of the base station can make a decision 33 about the users to be scheduled at one or several of the following time slots. Based on this decision, the required antenna weights for transmission to the scheduled receiver units are calculated 34 by applying the improved algorithm according to the present invention and the transmission 35 to these receiver units is initiated.

Figure 5:
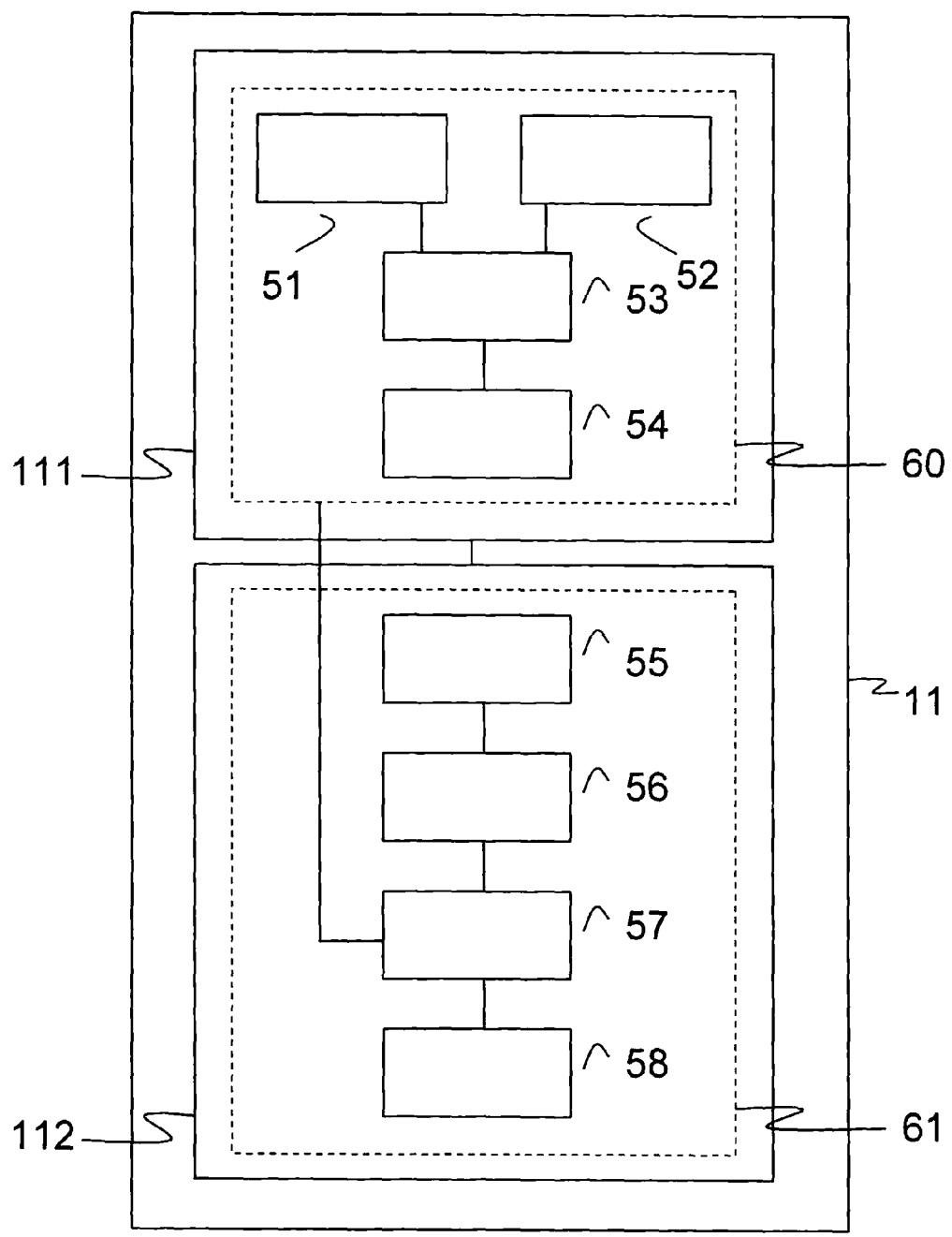
FIG. 5 illustrates a radio base station including the arrangement according to the present invention.

FIG. 5 illustrates the arrangement according to the present invention implemented, e.g., in a radio base station 11. The arrangement adapted for calculating the antenna weights for a beamforming transmission of data streams from a transmitter unit 111 to respective target receiver units comprises means 51 for weighting the interfering signal components for receiver units 122,123 other than the target receiver unit 121 with a receiver-specific interference suppression parameter δ; means 52 for weighting the desired communication signal at the target receiver unit 121 with a signal enhancement parameter μ; means 53 for determining the transmission signal x(t) at the antenna array ($A_1 \ldots A_k$) of the transmitter unit 111 from the weighted signal components and the corresponding antenna propagation vector for each receiver unit 121,122, 123; and means 54 for deriving the antenna weights $w_{opt,m}$ from the covariance matrix for the transmission signal and the covariances between said transmission signal and an at least sufficient approximation of the desired communication signal.

The scheduler 112 connected to the transmitter unit 111 comprises means 55 for determining signal processing capabilities including one or more weighting parameters for signal suppression and/or signal enhancement properties of the receiver units 121,122,123; a scheduler 56 adapted for scheduling one or more user equipments $UE_0$, $UE_1$, or $UE_n$ for a beamforming transmission of data streams based on at least said information of signal processing capabilities of their respective receiver units 121,122,123; means 57 for deriving antenna weights of the scheduled user equipments $UE_0$, $UE_1$, or $UE_n$ calculated according to the method described above; and means 58 for initiating the transmission of data streams to the scheduled user equipments $UE_0$, $UE_1$, or $UE_n$.

The embodiments described above are to be understood as illustrative examples. It will be understood by those skilled in the art that various modifications, combinations, and changes may be made to the embodiments without departing from the scope of the present invention. In particular, different part solutions in the different embodiments can be combined in other configurations, where technically possible. The scope of the present invention is defined by the appended claims.

The invention claimed is:

1. A method performed in a scheduler connected to a transmitter unit of a multi-antenna system for scheduling of user equipments in one or more subsequent time slots, wherein each user equipment includes a receiver unit, said method comprising:
    determining signal processing capabilities including one or more weighting parameters for signal suppression or signal enhancement properties of the receiver units;
    scheduling one or more user equipments for a beamforming transmission of data streams based on at least said signal processing capabilities of the respective receiver units;
    calculating antenna weights for each scheduled receiver unit by:
        weighting, for receiver units other than the scheduled receiver unit, each interfering signal component with a corresponding receiver-specific interference suppression parameter δ, wherein the corresponding receiver-specific interference suppression parameter δ relates to the capability of the scheduled receiver unit to suppress interference resulting from the interfering signal component;
        determining a transmission signal x(t) at the antenna array of the transmitter unit from the weighted signal components and a corresponding antenna propagation vector for each receiver unit;
        deriving the antenna weights $w_{opt,m}$ from a covariance matrix for the transmission signal and covariances between said transmission signal and desired communication signals for the scheduled receiver units, or sufficient approximations of the desired communication signals; and
    initiating transmission of data streams to the scheduled user equipments, according to the calculated antenna weights.

2. The method according to claim 1, wherein said method includes directing beams to first subsets of receiver units having a signal suppression above a first threshold value so as to minimize an interference contribution to second subsets of receiver units having a signal suppression below a second threshold value.

3. The method according to claim 2, wherein said method further includes directing beams to third subsets of receiver units having a signal suppression below a third threshold value so as to maximize a beam peak in a direction to the respective receiver units of said third subset.

4. The method according to claim 1, wherein said step of calculating further comprises calculating a signal enhancement parameter μ, for weighting the desired communication signal to be transmitted to a scheduled receiver unit, wherein the signal enhancement parameter μ provides a measure for the capability of the scheduled receiver unit to extract the desired communication signal from its received signal.

5. A method performed in a transmitter unit of a multi-antenna system for calculating the antenna weights for a beamforming transmission of data streams from the transmitter unit to each target receiver unit, the method comprising:
    weighting, for receiver units other than the target receiver unit, each interfering signal component with a corresponding receiver-specific interference suppression parameter δ, wherein the corresponding receiver-specific interference suppression parameter δ relates to the capability of the respective target receiver unit to suppress interference resulting from each interfering signal component;
    determining a transmission signal x(t) at the antenna array of the transmitter unit from the weighted signal components and a corresponding antenna propagation vector for each receiver unit; and
    deriving the antenna weights $w_{opt,m}$ from a covariance matrix for the transmission signal and covariances between said transmission signal and desired communication signals intended for the target receiver units, or sufficient approximations of the desired communication signals.

6. The method according to claim 5, further comprising the step of weighting the desired communication signal for a target receiver unit with a signal enhancement parameter μ that provides a measure for the capability of the target receiver unit to extract the desired communication signal from its received signal.

7. An arrangement in a transmitter unit of a multiantenna system adapted for calculating the antenna weights for a beamforming transmission of data streams from the transmitter unit to respective target receiver units, the arrangement configured to:
    weight each interfering signal component for receiver units other than a target receiver unit with a corresponding receiver-specific interference suppression parameter δ, wherein the corresponding receiver-specific interference suppression parameter δ relates to the capability of the target receiver unit to suppress interference resulting from the interfering signal component;
    determine a transmission signal x(t) at the antenna array of the transmitter unit from the weighted signal components and a corresponding antenna propagation vector for each receiver unit; and
    derive the antenna weights $w_{opt,m}$ from a covariance matrix for the transmission signal and covariances between said transmission signal and an at least sufficient approximation of a desired communication signal intended for the target receiver unit.

8. The arrangement according to claim 7, further configured to weight the desired communication signal for the target receiver unit with a signal enhancement parameter μ that provides a measure for the capability of the target receiver unit to extract the desired communication signal from its received signal.

9. The arrangement according to claim 7, wherein the multi-antenna system is a radio base station.

10. A scheduler connected to a transmitter unit of a multi-antenna system adapted for scheduling of user equipments in one or more time slots, wherein each user equipment includes a receiver unit, and wherein the scheduler is configured to:
- determine signal processing capabilities including one or more weighting parameters for signal suppression or signal enhancement properties of the receiver units;
- schedule one or more user equipments for a beamforming transmission of data streams based on the signal processing capabilities of their respective receiver units;
- derive antenna weights of each scheduled receiver unit by:
  - weighting, for receiver units other than the scheduled receiver unit, each interfering signal component with a corresponding receiver-specific interference suppression parameter $\delta$, wherein the corresponding receiver-specific interference suppression parameter $\delta$ relates to the capability of the scheduled receiver unit to suppress interference resulting from the interfering signal component;
- determining a transmission signal x(t) at the antenna array of the transmitter unit from the weighted signal components and a corresponding antenna propagation vector for each receiver unit;
- deriving the antenna weights $w_{opt,m}$ from a covariance matrix for the transmission signal and covariances between said transmission signal and an at least sufficient approximation of desired communication signals for the scheduled user equipments; and
- initiate the transmission of data streams to the scheduled user equipments.

* * * * *

UNITED STATES PATENT AND TRADEMARK OFFICE
CERTIFICATE OF CORRECTION

PATENT NO. : 8,588,694 B2  
APPLICATION NO. : 12/669548  
DATED : November 19, 2013  
INVENTOR(S) : Goransson et al.

It is certified that error appears in the above-identified patent and that said Letters Patent is hereby corrected as shown below:

On the title page, item (75), under "Inventors", in Column 1, Line 2, delete "Savedalen" and insert -- Sävedalen --, therefor.

On the title page, item (73), under "Assignee", in Column 1, Line 1, delete "Ericsson," and insert -- Ericsson (publ), --, therefor.

On the title page, in the Figure, for Tag "33", in Line 1, delete "decide" and insert -- Decide --, therefor.

In the Drawings

In Fig. 3, Sheet 3 of 6, for Tag "33", in Line 1, delete "decide" and insert -- Decide --, therefor.

In the Specification

In Column 2, Line 25, delete "beam-stearing" and insert -- beam-steering --, therefor.

In Column 3, Line 16, delete "illustrate" and insert -- illustrates --, therefor.

In Column 3, Line 44, delete "station" and insert -- station 11 --, therefor.

Signed and Sealed this  
Twenty-second Day of July, 2014

Michelle K. Lee  
*Deputy Director of the United States Patent and Trademark Office*